(12) United States Patent
Nijs et al.

(10) Patent No.: US 10,146,192 B2
(45) Date of Patent: Dec. 4, 2018

(54) METHOD FOR ADJUSTING AT LEAST ONE CONTROL PARAMETER OF AN INTERNAL COMBUSTION ENGINE

(71) Applicant: FEV GMBH, Aachen (DE)

(72) Inventors: Martin Nijs, Aachen (DE); Norman Liberda, Aachen (DE); Thivaharan Ablin Rajasingham, Aachen (DE); Dirk Abel, Aachen (DE)

(73) Assignee: FEV GmbH, Aachen (DE)

( * ) Notice: Subject to any disclaimer, the term of this patent is extended or adjusted under 35 U.S.C. 154(b) by 295 days.

(21) Appl. No.: 15/080,268

(22) Filed: Mar. 24, 2016

(65) Prior Publication Data

US 2016/0290251 A1 Oct. 6, 2016

(30) Foreign Application Priority Data

Mar. 31, 2015 (DE) .................. 10 2015 104 985

(51) Int. Cl.
*F02D 28/00* (2006.01)
*G05B 13/04* (2006.01)
(Continued)

(52) U.S. Cl.
CPC .......... *G05B 13/041* (2013.01); *F02B 37/004* (2013.01); *F02B 37/013* (2013.01);
(Continued)

(58) Field of Classification Search
CPC ...... F02B 37/004; F02B 37/013; F02B 37/18; F02D 2041/1418; F02D 2041/1433;
(Continued)

(56) References Cited

U.S. PATENT DOCUMENTS

| 6,311,493 B1* | 11/2001 | Kurihara | F02B 37/013 60/600 |
| 2006/0074501 A1* | 4/2006 | Hartman | G05B 13/027 700/29 |

(Continued)

FOREIGN PATENT DOCUMENTS

| DE | 102004005945 | 9/2005 |
| DE | 102010037368 | 3/2012 |

OTHER PUBLICATIONS

German Search Report on the priority application DE102015104985.6, filed Mar. 31, 2015.

*Primary Examiner* — Yuhui R Pan
(74) *Attorney, Agent, or Firm* — Dinsmore & Shohl LLP

(57) ABSTRACT

The invention relates to a method for adjusting at least one control parameter (KP) of an internal combustion engine (200) by means of at least two setting parameters (SP), having the following steps:
- determining an optimum steady-state combination (110) of the at least two setting parameters (SP) in order to obtain the setpoint value (104) under steady-state boundary conditions,
- producing a functional dynamic relationship (120) between the control error (100), a setting expenditure (130) for the at least two setting parameters (SP) and the determined steady-state combination (110),
- optimizing the dynamic relationship (120) in order to determine an optimum dynamic combination (140) of the at least two setting parameters (SP), and
- using the optimum dynamic combination (140) for the following adjustment step during the adjustment of the at least one control parameter (KP).

11 Claims, 5 Drawing Sheets

(51) Int. Cl.
*F02D 23/02* (2006.01)
*F02D 41/00* (2006.01)
*F02D 41/14* (2006.01)
*F02B 37/00* (2006.01)
*F02B 37/013* (2006.01)
*F02B 37/18* (2006.01)

(52) U.S. Cl.
CPC .............. *F02B 37/18* (2013.01); *F02D 23/02* (2013.01); *F02D 41/0007* (2013.01); *F02D 41/1401* (2013.01); *F02D 41/1406* (2013.01); *F02D 2041/1418* (2013.01); *F02D 2041/1433* (2013.01); *Y02T 10/144* (2013.01)

(58) Field of Classification Search
CPC .. F02D 23/02; F02D 41/0007; F02D 41/1401; F02D 41/1406; G05B 13/041; Y02T 10/144
See application file for complete search history.

(56) References Cited

U.S. PATENT DOCUMENTS

| | | | |
|---|---|---|---|
| 2011/0301723 A1 | 12/2011 | Pekar et al. | |
| 2013/0067894 A1* | 3/2013 | Stewart | ................... F01N 3/208 60/295 |
| 2015/0066337 A1 | 3/2015 | Langley et al. | |

\* cited by examiner

METHOD FOR ADJUSTING AT LEAST ONE CONTROL PARAMETER OF AN INTERNAL COMBUSTION ENGINE

CROSS-REFERENCE TO RELATED APPLICATIONS

This application claims priority of German Patent Application No. 10 2015 104 985.6 filed Mar. 31, 2015.

FIELD OF THE INVENTION

The present invention relates to a method for adjusting at least one control parameter of an internal combustion engine by means of at least two setting parameters, and to a corresponding control device.

BACKGROUND OF THE INVENTION

It is known that costly and complex adjustments have to be carried out in internal combustion engines. This very frequently involves adjustment devices which have two or more setting parameters available to them in order to obtain a setpoint value of a control parameter. For example, reference is made here to the charge pressure of an internal combustion engine which is exhaust-gas-turbo-supercharged in multiple stages, wherein this charge pressure can be influenced by means of appropriate settings either at the waste gate of the high-pressure turbocharger or at the waste gate of the low-pressure turbocharger.

A disadvantage with the known adjustment devices is that they are usually embodied in the form of complex PID controllers and/or characteristic diagrams. This leads to a situation in which the relationships between the desired control parameter and the corresponding at least two setting parameters have to be previously verified and/or produced in a costly way. This can be done only if costly test series are carried out on test internal combustion engines or on real vehicles. In particular, this leads to a large expenditure of time, a high cost outlay and a correspondingly high level of wear of the test internal combustion engines or test vehicles.

SUMMARY OF THE INVENTION

The object of the present invention is to at least partially overcome the disadvantages described above. In particular, the object of the present invention is economical and simple development of an adjustment method which can be made available at low cost.

The above object is achieved by means of a method having the features of claim 1 and a control device having the features of claim 10. Further features and details of the invention can be found in the dependent claims, the description and the drawings. In this context, features and details which are described in relation to the method according to the invention also apply, of course, in relation to the control device according to the invention, and respectively vice versa, with the result that reference can always be made reciprocally with respect to the disclosure of the individual aspects of the invention.

A method is proposed for adjusting at least one control parameter of an internal combustion engine by means of at least two setting parameters. Such a method has the following steps:

determining an optimum steady-state combination of the at least two setting parameters in order to obtain the setpoint value under steady-state boundary conditions, producing a functional dynamic relationship between the control error, a setting expenditure for the at least two setting parameters and the determined steady-state combination, optimizing the dynamic relationship in order to determine an optimum dynamic combination of the at least two setting parameters, and using the optimum dynamic combination for the following adjustment step during the adjustment of the at least one control parameter.

At the start of a method according to the invention it is also possible in this context to carry out the following step:

detecting a control error between an actual value and a setpoint value.

In this context, the method can also be carried out if a value in the region of 0 is detected as the control error, that is to say there is essentially no control error.

A method according to the invention is therefore also based on the core concept of adjusting an individual control parameter with at least two setting parameters. This can be the example described later of a turbo-charged engine which is supercharged in multiple stages and has a high-pressure waste gate and a low-pressure waste gate. However, a method according to the invention can basically also be used advantageously for an internal combustion engine whenever at least one control parameter is to be adjusted with at least two setting parameters. In such a case, a so-called multi-criteria problem is basically also referred to.

According to the invention, the method is in particular triggered, or the method begins, in particular, with the detection of a control error. However, the method according to the invention can also start without a detected control error or with a control error which is equal to zero. This is to be understood in a similar way to the case of standard adjustments. It is therefore possible to use a sensor device on the internal combustion engine to determine an actual value, for example the charge pressure of an internal combustion engine. At the same time, a setpoint value can be predefined which is available, for example, from the engine controller of the internal combustion engine. As long as the actual value and the setpoint value are different from one another, the control error has a value which is unequal to zero. There is therefore a difference between the actual value and the setpoint value, with the result that there is a need for adjustment in order to obtain the setpoint value of the control parameter from the actual value.

In the next adjustment step of the method according to the invention, steady-state boundary conditions are used as a basis. This means that at least two setting parameters, which are defined as an optimum steady-state combination, are determined on the basis of the predefined setpoint value. This also means that in a first step composed, for example, of a characteristic curve function and/or of a simulation model, which is simple or of any desired level of complexity, of the internal combustion engine, a static setpoint specification of these two setting parameters is assigned to the predefined setpoint value. This essentially involves a selection or simple determination of this steady-state combination. Since it is not ensured in all cases that the setpoint value will be obtained with this first rough specification, in a second step an optimization function can be used to find a combination of the setting parameters, with which combination the setpoint value of the control parameter can be reliably obtained and which combination is also as close as possible to the specifications. In particular, when this optimum steady-state combination is determined, the control error which is actually present or the real actual value is not taken into account. However, when the same model as in the dynamic optimization is used, the learnt model error can be taken into account.

The optimum steady-state combination is not sufficient to make the adjustment available in an improved way. Therefore, according to the invention a functional dynamic relationship is made available. This functional dynamic relationship is present between the already detected control error, a defined setting expenditure for the at least two setting parameters, and the determined steady-state combination. This means that such a dynamic relationship, as will also be explained later, can be made available, for example, in the form of a cost function. The functional dynamic relationship therefore also picks up, on the one hand, the control error. It is therefore possible, for example, for a composite term to be part of the functional dynamic relationship, which composite term includes the actual value with the setpoint value in a summing function. A further composite term of the cost function in the functional dynamic relationship can be the setting expenditure. It is therefore possible for a corresponding setting expenditure to be defined for each of the setting parameters, wherein it can be predefined as a specification that the setting expenditure in the functional dynamic relationship is to be reduced. This can also be referred to as a so-called penalty term in order to reduce an unnecessarily high adjustment intervention, or even avoid it entirely. The determined steady-state combination is also included in order to make available a combination of a steady-state relationship and a dynamic relationship for the adjustment functionality.

A simulation model of the internal combustion engine can then also be used as part of the functional dynamic relationship. It is therefore possible to predict the adjustment result within the functional dynamic relationship. By means of at least one adjustment step, the functional dynamic relationship can therefore predict the result of the desired adjustment interventions in the form of a wide variety of selected setting parameters, in the form of a simulation using the simulation model.

The individual results of this functional dynamic relationship can then be compared with one another, with the result that, as it were, an assessment or an evaluation of the quality of a wide variety of possible combinations of the two setting parameters can be generated in terms of the functional dynamic relationship.

In a subsequent step, this dynamic relationship is optimized in order to determine an optimum dynamic combination of the at least two setting parameters. This is to be understood as meaning, in particular, a corresponding selection of the combination of the two setting parameters, which selection constitutes an optimum on the basis of the produced functional dynamic relationship. Depending on the actual production of this dynamic relationship, this can be directed, for example, at obtaining the setpoint value as quickly as possible by means of correspondingly large setting processes. However, it is also conceivable for minimization of the adjustment intervention and therefore minimization of the setting expenditure to be the objective of such optimization. Basically, the core concept and the target direction of the optimization can be essentially freely selected in the sense of a present experience. In the case of use in an internal combustion engine, the optimization target can be permanently prescribed here or can be adapted as a function of a corresponding driving situation or a preselection by the driver.

According to the invention, the optimum dynamic combination which is determined in this way is used as a final method step for the following adjustment step. This means that the two optimized setting parameters of the optimum dynamic combination are passed on as setting variables to corresponding actuators. This also means that in the case of an engine which is exhaust-gas-turbo-charged in multiple stages corresponding setting variables represent the opening variables of the two waste gates of the high-pressure portion and the low-pressure portion.

In summary, a method according to the invention will therefore carry out an optimization function within the control loop. This optimization function is based both on static and steady-state considerations as well as on dynamic criteria. In other words, a process of determining an optimization is passed through for each adjustment step, with the result that combinations of the setting variables which are optimized for each individual adjustment step, and are therefore specific to this adjustment step, can be made available.

On the basis of the understanding above it becomes clear that by virtue of the present invention the adjustment process itself includes a high level of intelligence. In other words, optimization of a permanently predefined adjustment process before the use of the internal combustion engine is no longer necessary. Instead, it is sufficient to predefine basic core considerations of the functional dynamic relationship, which considerations are subsequently satisfied within the scope of the method according to the invention for each individual adjustment step with corresponding parameters. This brings about a situation in which each adjustment step leads automatically to an optimized correlation or a combination of the at least two setting parameters.

The use of an optimization loop within the control loop then permits such an adjustment method to be adapted to an internal combustion engine within a very short time. It is therefore possible to achieve an extreme time advantage compared to known validation possibilities in the form of characteristic diagrams or classic PID controllers of an internal combustion engine. Whereas slow adaptation and optimization of the characteristic diagrams or adjustment mechanisms has to take place over several weeks with customary methods, a method according to the invention can make available a corresponding adjustment within a very short time, in particular within less than an hour. This permits, on the basis of the high level of computing power which is frequently already present in the vehicle, the actual application expenditure to be extremely reduced in advance during the development of the means of adjusting the internal combustion engine.

In addition to the fact that the expenditure involved in producing the adjustment method is significantly reduced in an inventive way, the actual adjustment itself is optimized with respect to the specific individual case. It is therefore no longer necessary to configure an adjustment for compromise cases but instead the iterative optimization for each individual adjustment step makes it possible to generate optimum combinations of the at least two setting parameters in a specific way. Therefore, even the explicit adjustment itself is improved in an optimized way and can bring about improved performance during the operation of the internal combustion engine.

It can be advantageous if in a method according to the invention the functional dynamic relationship is produced, in particular predefined, in the form of a cost function, wherein at least one summing function is respectively produced for the control error, the setting expenditure and the steady-state relationship. The cost function is here the functional dynamic relationship, wherein a composite term is, in particular, the sum of different individual components which is summed over a defined or free iteration number. In this way, the described optimization step can subsequently be carried out in the form of a finite integral or a finite sum. The cost function itself therefore forms a prescribed or prescribable framework which is filled in or equipped with the respective specific parameters or boundary conditions of the respective present adjustment case in the respective present control loop.

It is also an advantage if in a method according to the invention individual parts of the dynamic relationship, in particular individual terms of the summing function of the cost function according to the paragraph above have a weighting. Such a weighting can also be referred to as a penalty term. This means that adaptation to individual components within the adjustment process can take place by means of the weighting. Therefore the weight of the influence of the respective component within the dynamic relationship can be adapted. For example, it may be desired to provide a setting variable with a relatively large influence. By corresponding weighting of this setting variable or of the contrary setting variable it is possible to take this into account accordingly during the optimization. The adjustment influence of individual components, for example of the setting expenditure, the control error or the steady-state relationship can therefore be increased or reduced.

Likewise it can be advantageous if in a method according to the invention the dynamic relationship is optimized iteratively, in particular within a defined iteration specification. The iteration can be carried out, in particular, in a finite way. It is therefore possible for this iteration to contain, for example, a defined, predefined maximum number of iteration steps. A predefined maximum time can also be made available for this iteration. In particular when maximum times are specified for the actual individual control loops, it is possible here, for example, for a time specification to be given in the millisecond range. The iteration is to be respectively balanced here with respect to the speed of the adjustment intervention, on the one hand, and with respect to the quality of the achievable optimum, on the other.

It is also advantageous if in a method according to the invention a static setpoint specification is predefined before the optimum steady-state combination is determined. This can also be referred to as pre-targets. This can be understood to be a basic specification which lasts over the entire method. This setpoint specification can describe, for example, that the one or other setting parameter is to be preferred irrespective of all the other influencing variables. The static setpoint specification can also be understood to be global weighting in the sense of a method according to the invention.

A further advantage is that in a method according to the invention a first simulation model of the relationship between the at least one control parameter and the at least two setting parameters is used for the determination of the optimum steady-state combination. As has already been indicated, a simulation model can be used for this determination step of the optimum steady-state combination. In particular, the same model as in the dynamic optimization can be used here. Such a simulation model can be produced once in advance for the respective internal combustion engine in the form of a test bench and corresponding measurements.

It is also advantageous if in a method according to the invention a second simulation model of the relationship between the at least one control parameter and the at least two setting parameters is used for the determination of the dynamic relationship. In particular, the first and second simulation models can be identical models. A correspondingly second simulation model can also be determined here on the basis of a test setup on a test stand of an internal combustion engine. If the first and second simulation models differentiate different forms, a more precise or more complex model is to be selected, in particular, as a second simulation model, in order correspondingly to improve the dynamic relationship in terms of its optimization quality.

A further advantage can be achieved if in a method according to the invention, before the production of the functional dynamic relationship, a simulation actual value is determined for the actual value with a first simulation model and/or a second simulation model. In this case, the difference between the simulation actual value and the actual value is taken into account as an error term in the determination of the optimum steady-state combination and/or in the production of the functional dynamic relationship. This can also be referred to as an observer function. The error term is preferably newly determined here at each iteration pass of the adjustment process and is therefore specific to the respective adjustment step in a control loop. Of course, it is also conceivable to feed back error terms into the respective simulation model, with the result that, in particular, self-learning simulation models are produced. In the case of an error term which varies between similar values for a certain defined number of adjustment steps it is therefore possible for corresponding adaptation of the simulation model to take place. This is provided, in particular, in an automatic embodiment. Basically, this observer function improves the quality of the adjustment method according to the invention further, since corresponding adaptation is made available by means of the error term depending on the actual situation.

It is a further advantage if in a method according to the invention the charge pressure of an internal combustion engine which is exhaust-gas-turbo-supercharged in multiple stages is adjusted as at least one control parameter, using the setting of the waste gates as at least two setting parameters. This involves a particular embodiment of a method according to the invention in which the advantages which have already been explained repeatedly are particularly strongly manifested. Therefore, multi-stage exhaust-gas-turbo-charging with two waste gates constitutes a corresponding multi-criteria optimization problem or adjustment problem which can be applied with very low expenditure by arranging an optimization loop within the control loop. The optimization then takes place within the control loop, with the result that the repeatedly explained optimum combination of the setting parameters is made available for each control loop for the multi-criteria control problem.

A control device for adjusting at least one control parameter of an internal combustion engine by means of at least two setting parameters is also a subject matter of the present invention. Such a control device has, in particular, a detection unit for detecting a control error between an actual value and a setpoint value of the control parameter. Furthermore, a computing unit is provided for determining an optimum steady-state combination of the at least two setting parameters in order to obtain the setpoint value under steady-state boundary conditions. The computing unit is also designed to produce a functional dynamic relationship between the control error, a setting expenditure for the at least two setting parameters, and the determined steady-state combination as well as to optimize the dynamic relationship in order to determine an optimum dynamic combination of the at least two setting parameters. Not least, an adjustment unit is provided for using the optimum dynamic combination for the following adjustment step during the adjustment of the at least one control parameter. In a control device according to the invention, the detection unit, the computing unit and/or the adjustment unit are preferably designed to carry out a method according to the invention. Accordingly, a control device according to the invention entails the same advantages as have been explained in detail with respect to a method according to the invention.

BRIEF DESCRIPTION OF THE DRAWINGS

Further advantages, features and details of the invention can be found in the following description in which exemplary embodiments of the invention are described in detail with reference to the drawings. Here, the features which are mentioned in the claims and in the description may respectively be essential to the invention individually per se or in any desired combination. In the drawings, in each case in a schematic form:

DETAILED DESCRIPTION OF THE INVENTION

Figure 1:
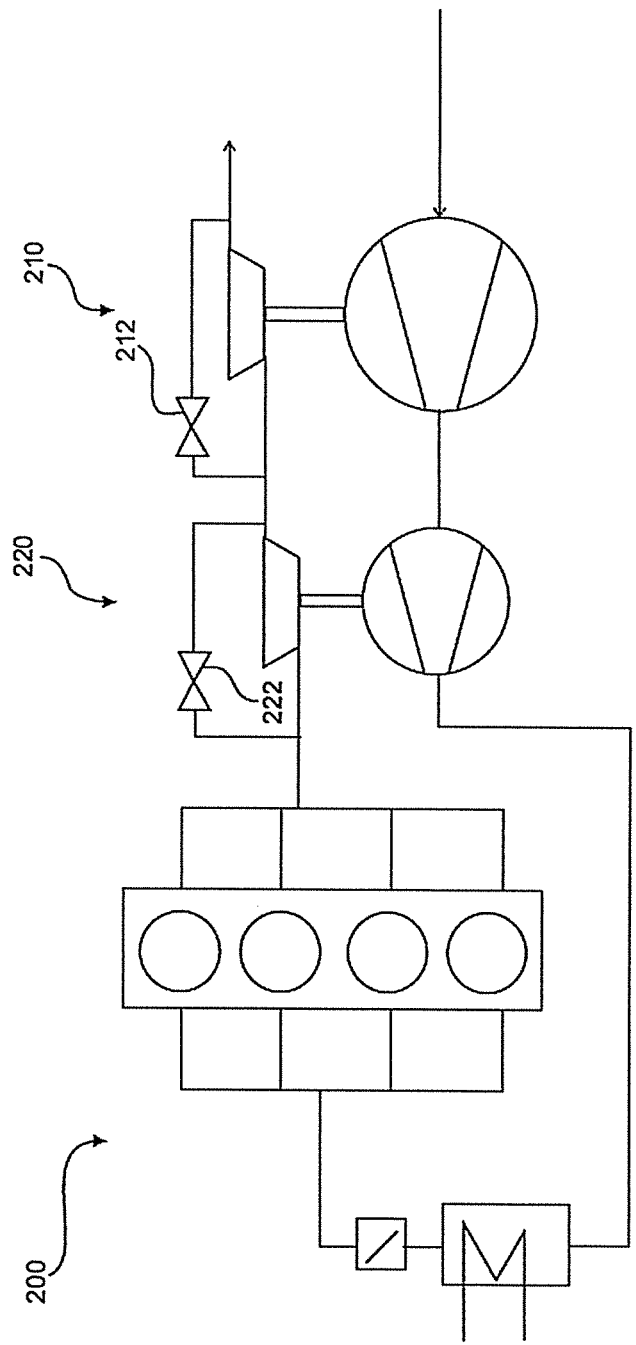
FIG. 1 shows an internal combustion engine as the basis of a method according to the invention.

FIG. 1 is a schematic illustration of a four-cylinder internal combustion engine 200. The multi-stage exhaust-gas-turbo-charging system is equipped with a low-pressure turbine 210 and a high-pressure turbine 220. A corresponding waste gate valve 212 and 222 is provided for each of the two individual turbo-charging stages 210 and 220. A control device 10, such as is known, for example, in FIGS. 2 to 4, can be used for this embodiment of an internal combustion engine 200.

Figure 2:
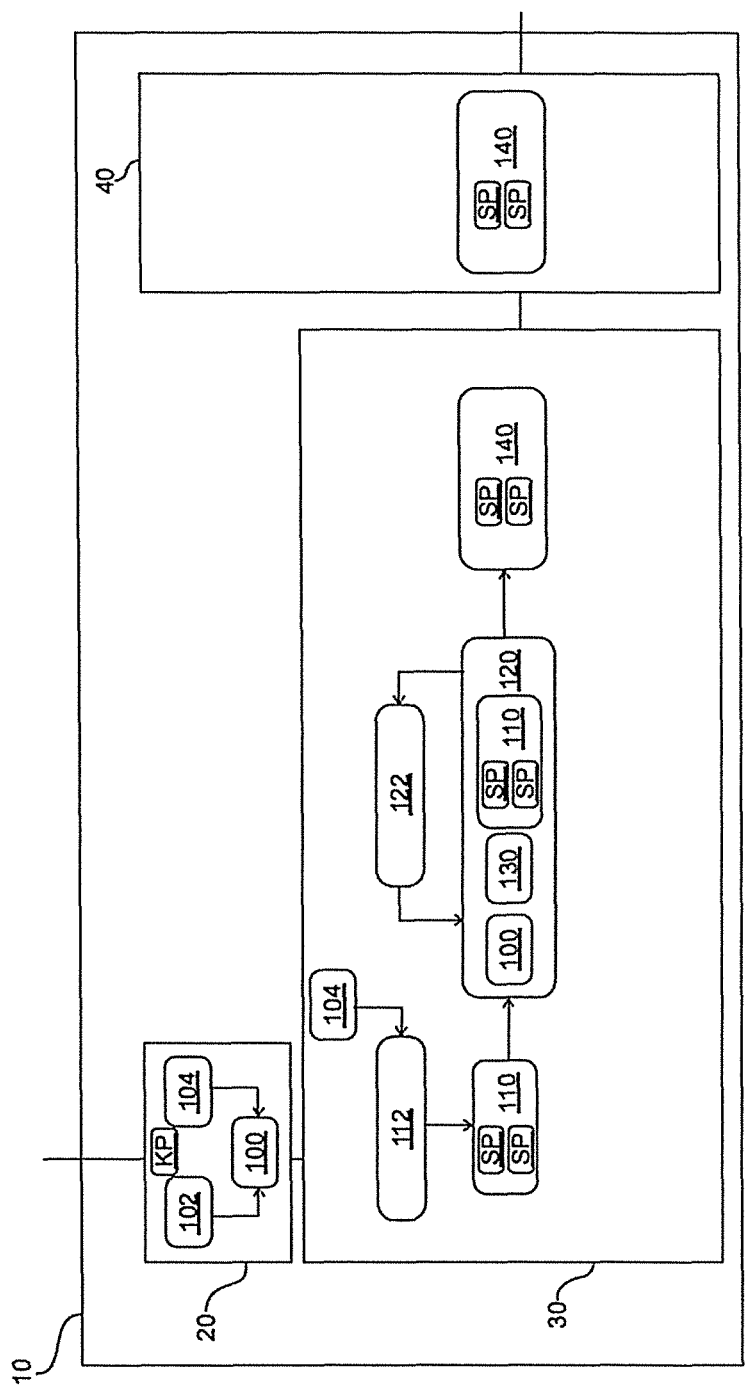
FIG. 2 shows a control device according to the invention for carrying out a method according to the invention.

FIG. 2 shows a first embodiment of a control device 10 according to the invention. Said control device 10 is based basically on a detection unit 20, a computing unit 30 and an adjustment unit 40. The three units 20, 30 and 40 can also be combined, for example, in a common computer unit.

The first step of a method according to the invention takes place in the detection unit 20. Here, an actual value 102 of a control parameter KP, originating, for example, from a corresponding sensor unit, is input. At the same time, the specification of a setpoint value 104 takes place here, which setpoint value 104 can also be made available, for example, by a separate engine controller. Here, a control error 100 is detected which is zero given identity of the setpoint value 104 and of the actual value 102.

According to FIG. 2, an optimum steady-state combination 110 of the at least two setting parameters SP is made available or determined in a first sub-step in the computing unit 30 taking into account the setpoint value 104 by means of a first simulation model 112. Then, a dynamic functional relationship 120 is determined on the basis of a second simulation model 122. Said dynamic functional relationship 120 is based, in the form of a cost function, on the optimum steady-state combination 110, the control error 100 and a setting expenditure 130. These three elements of the functional dynamic relationship 120 can have weightings in order to amplify or weaken corresponding adjustment effects. In correlation with the second simulation model 122, optimization takes place here with the result of an optimum dynamic combination 140 of the at least two setting parameters SP. This optimum dynamic combination 140 is transferred to the adjustment unit 40, with the result that precisely these selected setting parameters SP of the optimum dynamic combination 140 can be used for the adjustment process.

As is apparent from the description above, an optimization loop therefore takes place within the actual control loop. The description above explains an adjustment step. The control error will then have changed, since the changing of the setting parameters SP will have correspondingly resulted in the formation of a new actual value 102. The adjoining control loop will be run through with the new parameters once more in the same way.

Figure 3:
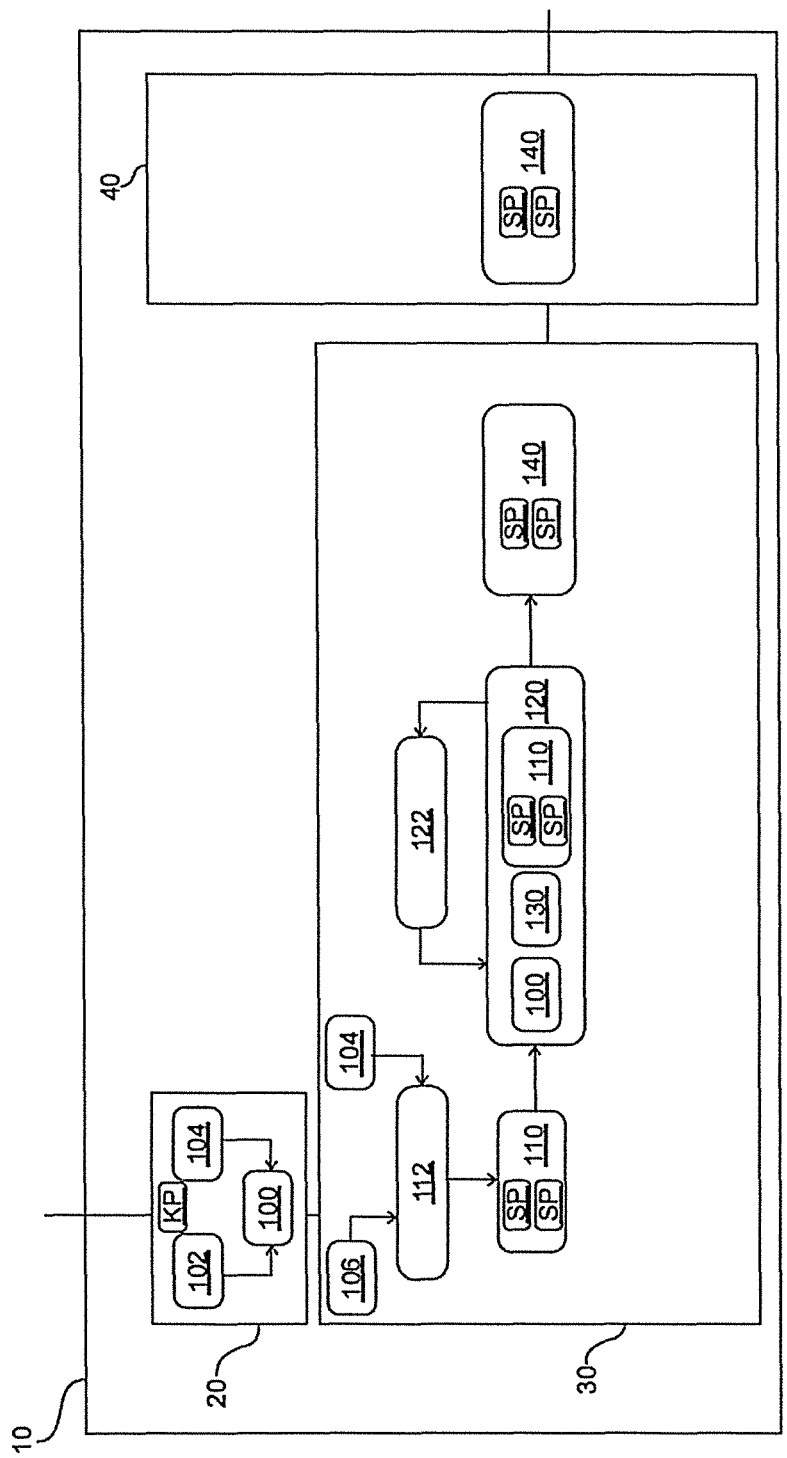
FIG. 3 shows an alternative control device for carrying out a method according to the invention.

FIG. 3 shows a variation of the control device 10 according to the invention according to FIG. 2. Here, an alternative of the method according to the invention is carried out. Basically, the run-through is identical with the result that only the differences will be explained here. Therefore, in this embodiment a static setpoint specification 106 is taken into account in the step of the steady-state combination 110. This static setpoint specification can also be referred to as a pre-selection and can, in particular, influence basic preference or disadvantaging of an individual specific setting parameter SP. Furthermore, in the embodiments in FIG. 3, iteration of the optimization is also provided as an optimization loop during the implementation of the functional dynamic relationship 120. This iteration as an optimization loop can take place over a defined maximum time period or, for example, over defined maximum iteration steps. Minimization of an error term can also be a target variable of the iteration number.

Figure 4:
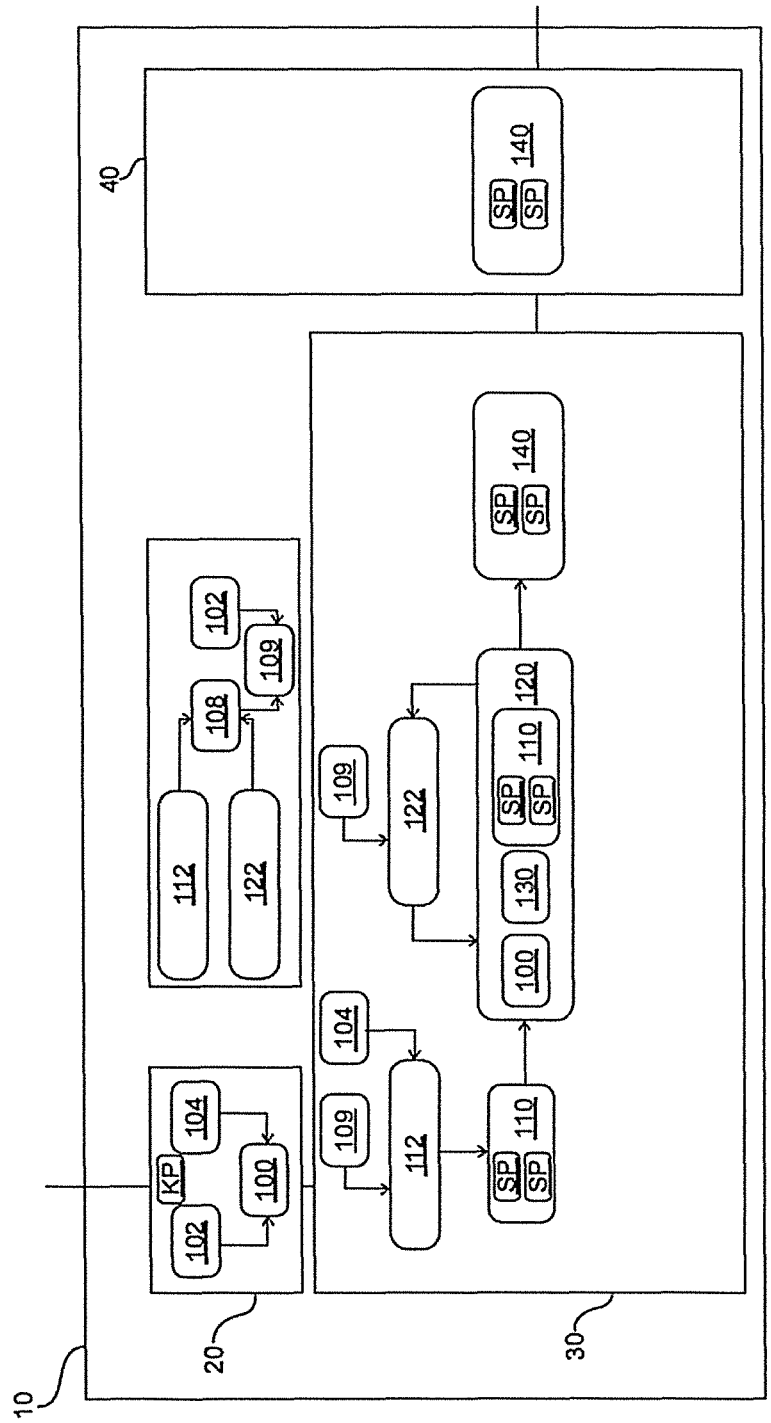
FIG. 4 shows an alternative control device for carrying out a method according to the invention.

FIG. 4 illustrates a further variation of a control device 10 according to the invention and of a corresponding method according to the invention. Here, a simulation actual value 108 which is based on the existing setpoint value 104 in one simulation model 112, 122 or, as is the case in FIG. 4, in both simulation models 112 and 122 is determined. As a result, the actual value 102 is compared with the corresponding simulation actual value 108, so that an error term 109 represents this difference. This error term 109 is then taken into account in the respective simulation model 112 and/or 122.

Figure 5:
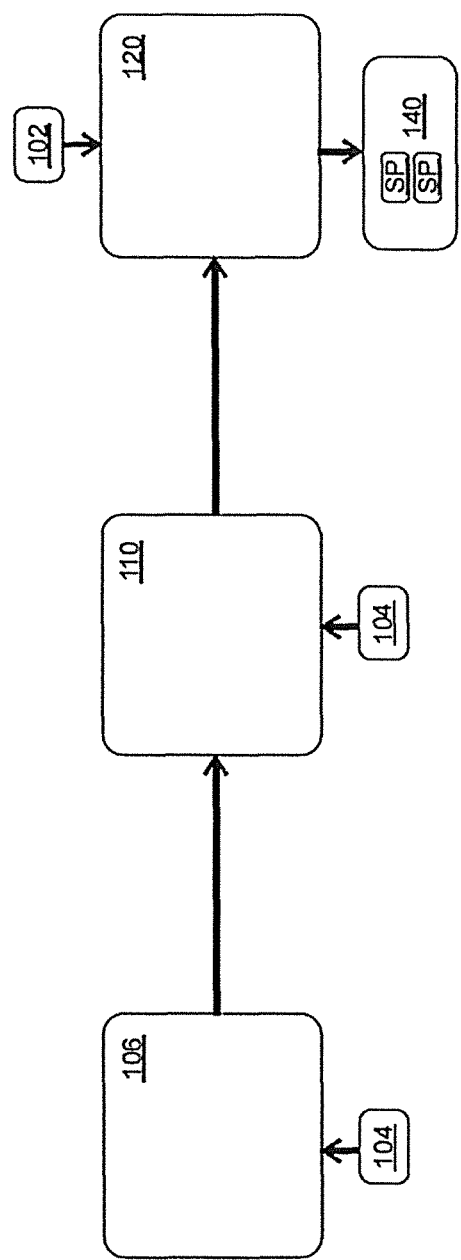
FIG. 5 shows a schematic illustration of the execution of a method according to the invention.

FIG. 5 shows an embodiment of the present invention. Here, in particular the three steps which can be run through in a method according to the invention become particularly clear. For example, the method starts here with the specification of a static setpoint specification 106. This step can also be referred to as a pre-target. For this step, for example the engine rotational speed and/or the charge pressure can be introduced as setpoint values 104. The transfer to an optimum steady-state combination 110, which can also be referred to as a target selector, takes place subsequently. Here, static optimization, in particular taking into account the charge pressure as a setpoint value 104, takes place. Then, the transfer to the dynamic relationship 120 takes place, after which the dynamic optimization is carried out. Here, the actual value 102 of the charge pressure can then also be taken into account. As a result, in this way the optimum dynamic combination 140 can be obtained for the setting parameters SP.

The explanation above of the embodiments describes in the present invention exclusively within the scope of examples. Of course, individual features of the embodiments can also, where technically appropriate, be free to combine with one another without departing from the scope of the present invention.

The invention claimed is:

1. A method for adjusting at least one control parameter of an internal combustion engine by means of at least two setting parameters, the method comprising the following steps:
   determining an optimum steady-state combination of the at least two setting parameters in order to obtain a setpoint value under steady-state boundary conditions,
   producing a functional dynamic relationship between a control error, a setting expenditure for the at least two setting parameters and the determined steady-state combination,
   optimizing the functional dynamic relationship in order to determine an optimum dynamic combination of the at least two setting parameters, and
   using the optimum dynamic combination for a following adjustment step during an adjustment of the at least one control parameter,
   wherein the at least two setting parameters of the optimum dynamic combination are passed on as setting variables to corresponding actuators.

2. The method according to claim 1,
   wherein the functional dynamic relationship is produced, in particular predefined, in the form of a cost function, wherein at least one summing function is respectively produced for the control error, the setting expenditure and a steady-state relationship.

3. The method according to claim 2,
   wherein individual terms of the at least one summing functions of the cost function have a weighting.

4. The method according to claim 1,
   wherein the functional dynamic relationship is optimized iteratively within a defined iteration specification.

5. The method according to claim 1,
   wherein a static setpoint specification is predefined before the optimum steady-state combination is determined.

6. The method according to claim 1,
   wherein a first simulation model of the relationship between the at least one control parameter and the at least two setting parameters is used for the determination of the optimum steady-state combination.

7. The method according to claim 1,
   wherein a second simulation model of the relationship between the at least one control parameter and the at least two setting parameters is used for the determination of the functional dynamic relationship.

8. The method according to claim 1,
   wherein before the production of the functional dynamic relationship, a simulation actual value is determined for an actual value with a first simulation model and/or a second simulation model, wherein the difference between the simulation actual value and the actual value is taken into account as an error term in the determination of the optimum steady-state combination and/or in the production of the functional dynamic relationship.

9. The method according to claim 1,
   wherein a charge pressure of the internal combustion engine which is exhaust-gas-turbo-supercharged in multiple stages is adjusted as at least one control parameter, using a setting of two waste gates of two turbochargers as at least two setting parameters.

10. A control device for adjusting at least one control parameter of an internal combustion engine by means of at least two setting parameters, comprising:
    a detection unit;
    a computing unit;
    an adjustment unit;
    the detection unit detects a control error between an actual value and a setpoint value of the control parameter;
    the computing unit determines an optimum steady-state combination of the at least two setting parameters in order to obtain the setpoint value under steady-state boundary conditions, the computing unit produces a functional dynamic relationship between the control error, a setting expenditure for the at least two setting parameters, and the determined steady-state combination, and optimizing the functional dynamic relationship in order to determine an optimum dynamic combination of the at least two setting parameters;
    the adjustment unit uses the optimum dynamic combination for the following adjustment step during the adjustment of the at least one control parameter,
    wherein the at least two setting parameters of the optimum dynamic combination are passed on as setting variables to corresponding actuators.

11. The control device according to claim 10,
    wherein that the detection unit, the computing unit and/or the adjustment unit are designed to determine an optimum dynamic condition.

* * * * *